United States Patent [19]

Kayukawa et al.

[11] Patent Number: 4,981,419
[45] Date of Patent: Jan. 1, 1991

[54] WOBBLE PLATE TYPE REFRIGERANT COMPRESSOR HAVING A THRUST BEARING ASSEMBLY FOR A WOBBLE PLATE SUPPORT

[75] Inventors: Hiroaki Kayukawa; Kenji Takenaka; Takashi Okamoto; Akihiko Hyodo, all of Kariya, Japan

[73] Assignee: Kabushiki Kaisha Toyoda Jidoshokki Seisakusho, Aichi, Japan

[21] Appl. No.: 394,074

[22] Filed: Aug. 15, 1989

[30] Foreign Application Priority Data

Aug. 26, 1988 [JP] Japan ................................ 63-112590

[51] Int. Cl.$^5$ ................................................ F04B 1/12
[52] U.S. Cl. ..................................... 417/269; 384/621
[58] Field of Search ......................... 384/621; 417/269

[56] References Cited

U.S. PATENT DOCUMENTS

| | | | |
|---|---|---|---|
| 2,997,349 | 8/1961 | Pitner | 384/621 |
| 4,042,309 | 8/1977 | Hiraga | 417/269 |
| 4,225,200 | 9/1980 | Dougall | 384/621 |
| 4,730,986 | 3/1988 | Kayukawa et al. | 417/222 |

FOREIGN PATENT DOCUMENTS 635898 2/1962 Canada ................................ 384/621

0120691 3/1984 European Pat. Off. .
0220798 5/1987 European Pat. Off. .
3713696 4/1987 Fed. Rep. of Germany .

Primary Examiner—A. Michael Chambers
Attorney, Agent, or Firm—Burgess, Ryan & Wayne

[57] ABSTRACT

A thrust bearing assembly of a wobble plate type refrigerant compressor for supporting a non-rotatable inclined wobble plate on a rotatable drive element which rotates with a drive shaft, and having a inclined drive face able to convert a rotating motion of the drive element into a wobbling motion of the wobble plate to thereby cause a reciprocation of compression pistons in cylinder bores, the thrust bearing assembly having a plurality of roller elements, an annular retainer elements holding the roller elements therein and rotating in a space between the drive face of the drive element and an inclined face of the wobble plate confronting the drive face, a pair of race elements attached to the drive and inclined faces of the drive element and the wobble plate to provide raceways for rolling of the roller elements, and a circumferentially extended guide way element supplying the annular retainer elements with a constant slide guide during the operation of the compressor irrespective of a change in the operating speed and compression ratio of the compressor.

6 Claims, 6 Drawing Sheets

WOBBLE PLATE TYPE REFRIGERANT COMPRESSOR HAVING A THRUST BEARING ASSEMBLY FOR A WOBBLE PLATE SUPPORT

BACKGROUND OF THE INVENTION

1. Field of the Invention

The present invention relates to a wobble plate type refrigerant compressor having a non-rotatable wobble plate supported on a rotatable drive element via a wobble plate support including a thrust bearing assembly. More particularly, the present invention relates to a thrust bearing assembly for a wobble plate support adapted for a wobble plate type compressor, which assembly functions to reliably support a non-rotatable wobble plate on a rotatable drive element while holding an assembly of roller elements and an annular retainer element of the thrust bearing assembly in position to resist a thrust force acting on the wobble plate due to reaction of pressure of a refrigerant gas compressed by reciprocatory pistons.

2. Description of the Related Art

Japanese Unexamined Utility Model Publication No. 62-88887 discloses a wobble plate type compressor having a drive shaft receiving a drive force from outside of the compressor, a rotatable drive element mounted on the drive shaft and having a drive face inclined with respect to a plane vertical to the axis of the drive shaft, a non-rotatable wobble plate supported on the drive face of the rotatable drive element via a thrust bearing assembly, a plurality of compression pistons reciprocated in a plurality of cylinder bores of a cylinder block by the wobble plate, and piston rods for compressing refrigerant gas of an air-conditioning or refrigerating circuit. The wobble plate is held on a ball-bearing and is able to wobble thereabout when driven by the drive element, and rotation thereof is prevented by a bevel gear engagement arranged between the wobble plate and an end of a ball-support shaft mounted in the cylinder block. The wobble plate is also resiliently urged by a spring element axially toward the drive face of the drive element. The thrust bearing assembly supporting the non-rotatable wobble plate on the drive face of the rotatable drive element is arranged to resist the above-mentioned resilient force of the spring element and an axial reaction force acting on the wobble plate due to compression of the refrigerant gas by the pistons, and includes a plurality of roller elements and a retainer element for retaining the roller elements in position while preventing a radial displacement thereof. The thrust bearing assembly is held between the inclined drive face of the drive element and the wobble plate by a pair of annular guide races attached to the ends of the drive element and the wobble plate. Namely, the annular guide races not only allow the roller elements to perform a stable rolling operation but also regulate the movement of the retainer element.

In accordance with the above-mentioned arrangement for supporting the non-rotatable wobble plate, an unfavorable state of the wobble plate occurs during the operation of the compressor such that the wobble plate is displaced and separated from the drive face of the drive element in a direction corresponding to a direction of the piston motion when compressing the refrigerant gas against the above-mentioned spring force and the high refrigerant gas pressure transmitted via the pistons, due to a large inertia of the wobble plate per se accompanying the wobbling motion of the wobble plate. As a result, a distance between the drive face of the drive plate and the wobble plate is increased, and therefore, the thrust bearing assembly is not adequately held between the drive face of the drive plate and the wobble plate. Namely, when the distance between the drive face of the rotatable drive element and the wobble plate is increased, the pair of guide races fail to adequately guide the thrust bearing assembly, and the retainer element of the thrust bearing assembly carries out an unregulated movement between the drive element and the wobble plate. Consequently, the retainer element is damaged or broken due to wear thereof, resulting in a breakage of the roller elements of the thrust bearing assembly. Particularly, while the compressor is performing a high speed operation, the above-mentioned separation of the wobble plate from the drive face of the drive element often occurs and becomes a cause of damage to or breakage of the thrust bearing. This is therefore fatal to the reliability of the operation of the wobble plate type compressor, especially in a high speed operational range of the compressor. On the other hand, since the internal construction and arrangement of the wobble plate type compressor are complicated, it is impossible to prevent an occurrence of the separation of the wobble plate from the drive element over the entire operational range from a low speed operation to a high speed operation of the compressor.

SUMMARY OF THE INVENTION

Therefore, an object of the present invention is to provide a wobble plate type refrigerant compressor having a thrust bearing assembly held in position on a rotatable drive element to support a non-rotatable wobble plate while resisting a thrust force acting on the wobble plate, and being resistant to damage or breakage regardless of the occurrence of a separation of the wobble plate from the drive element during the operation of the wobble plate type compressor.

Another object of the present invention is to provide a wobble plate type compressor having a reliable operation and capable of ensuring a long operating life of the compressor.

In accordance with the present invention, there is provided a wobble plate type refrigerant compressor including an open-ended cylinder block defining a plurality of axial cylinder bores and a crank chamber therein, a first housing attached to one of the open ends of the cylinder block, to close the open end of the cylinder block and rotatably support an axial drive shaft, a second housing attached to the other open end of the cylinder block to close the other open end of the cylinder block and define suction and discharge chambers for receiving a refrigerant gas before and after compression, a drive element fixedly mounted on the drive shaft to be rotatable therewith and having a drive face inclined with respect to a plane vertical to an axis of the drive shaft, a plurality of pistons received in the plurality of cylinder bores to be reciprocated in the cylinder bores to thereby compress the refrigerant gas, and a non-rotatable wobble plate supported on the drive element via a thrust bearing assembly, the wobble plate having a first face facing the drive face of the drive element and an opposite second face operatively connected to the plurality of pistons via piston rods, to thereby cause a reciprocation of the plurality of pistons in response to a rotation of the drive element. The compressor is characterized in that the thrust bearing assembly comprises a plurality of roller elements arranged between the drive face of the drive element and the first face of the non-rotatable wobble plate, to allow the drive element to be freely rotated against the non-rotatable wobble plate, a retainer element arranged to extend circumferentially in a space between the drive face of the drive element and the first face of the wobble plate, for retaining the plurality of roller elements in position, a first annular race element arranged between the drive face of the drive element and the thrust bearing assembly and having a first annular raceway, a second annular race element arranged between the thrust bearing assembly and the first face of the wobble plate and having a second annular raceway capable of cooperating with the first annular raceway of the first annular race element, to permit the roller elements of the thrust bearing assembly to roll between the first and second raceways, and a circumferentially extended guide element provided with a circumferential guide way to guide a radially innermost end of the retainer element, the circumferential guide way extending substantially perpendicularly to both the drive and first faces of the drive element and the wobble plate to provide a guide width sufficient to supply the radially innermost end of the retainer element with a constant sliding guide over an entire range of a rotating speed of the drive element.

BRIEF DESCRIPTION OF THE DRAWINGS

The above and other objects, features and advantages of the present invention will become more apparent from the ensuing description of preferred embodiments of the present invention with reference to the accompanying drawings wherein.

DESCRIPTION OF THE PREFERRED EMBODIMENTS

Referring to FIGS. 1 through 4, a wobble plate type refrigerant compressor has a cylinder block 1 in the shape of an open-ended generally round element having a cylindrical crank chamber 1a in a front half portion of the element, and a plurality of equiangularly arranged cylinder bores 1b in a rear half portion of the element. An end plate or front housing 2 is attached to one of the open ends, i.e., the front open end of the cylinder block 1, to close the open end and to support an axial drive shaft 4 rotatably via a rotary bearing 4a. A rear housing 3 is attached to the rear open end of the cylinder block 1 to close the end via a valve plate unit 3c, and to define a radially outer suction chamber 3a for a refrigerant gas before compression and a radially inner discharge chamber 3b for the refrigerant gas after compression.

Figure 1:
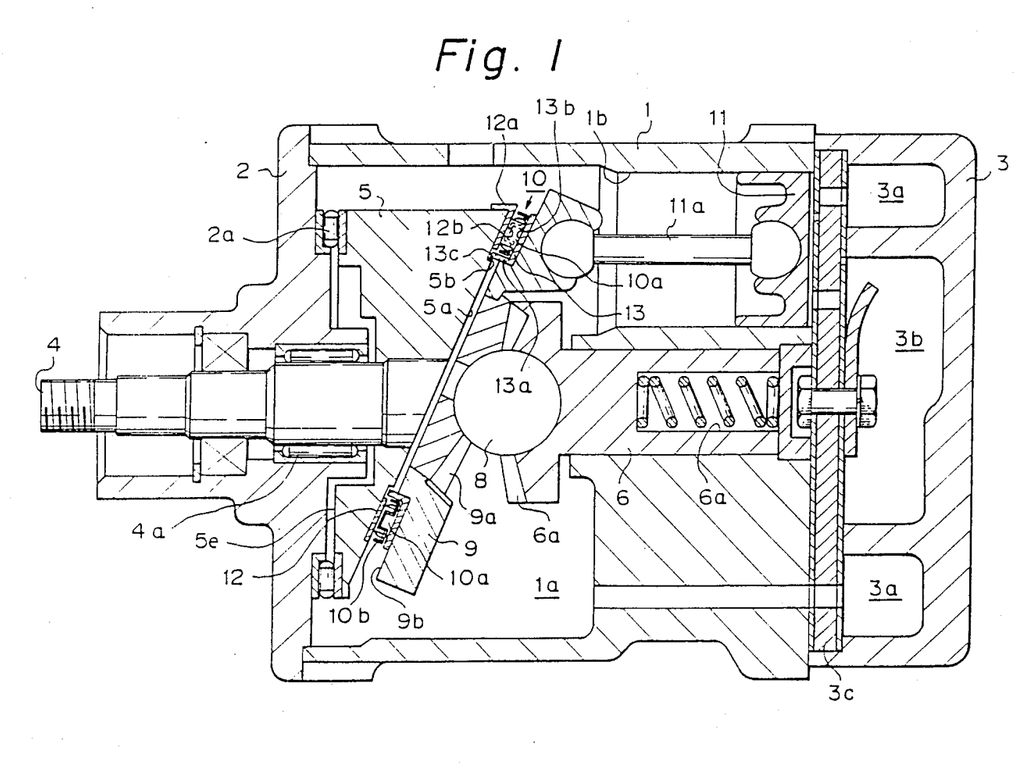
FIG. 1 is a longitudinal cross-sectional view of a wobble plate type refrigerant compressor having a wobble plate support according to a first embodiment of the present invention.

A drive element 5 is mounted on an inner end of the axial drive shaft 4 to be rotated with the drive shaft 4 in the crank chamber 1a. The drive element 5 has a front vertical face 5e bearing against an inner face of the front housing 2 via a thrust bearing 2a and an opposite face 5a inclined by a predetermined angle from a plane vertical to the axis of the drive shaft 4. The inclined face 5a of the drive element 5 is provided as a drive face described later. A support shaft 6 is slidably fitted in a central bore of the cylinder block 1 to be coaxial with the drive shaft 4. The support shaft 6 is axially urged toward the front side of the compressor by a spring element 7 arranged between in a central bore 6a of the support shaft 6. Namely, the spring element 7 has one end engaged with an axial bottom of the central bore 6a of the support shaft 6, and the other end engaged with a seat element fixed to the rear end of the cylinder block 1. The support shaft 6 has an innermost end formed with a bevel gear 6a to be disposed in the crank chamber 1a and facing the innermost end of the drive shaft 4. A ball bearing 8 and a non-rotatable wobble plate 9 are arranged between both innermost ends of the drive and support shafts 4 and 6 within the crank chamber 1a. The wobble plate 9 has front and rear faces, and the rear face is centrally provided with a bevel gear 9a engaged with the bevel gear 6a of the support shaft 6. The bevel gear 9a of the wobble plate 9 is centrally socketed to be slidably engaged with the ball bearing 8 of the support shaft 6, and therefore, the wobble plate 9 is permitted to perform a later-described non-rotary wobbling motion about the center of the ball bearing 8 through the above-mentioned bevel gear engagement and the sliding engagement of the socket of the bevel gear 9a and the ball bearing 8. The rear face of the wobble plate 9 is operatively connected to a plurality of pistons 11 slidably fitted in the cylinder bores 1b of the cylinder block 1 via piston rods 11, each having ball-socket joints on both ends as illustrated in FIG. 1. The cylinder bores 1b are fluidly connected to the crank chamber 1a and the suction and discharge chambers 3a and 3b.

A thrust bearing assembly 10 is arranged between the inclined face 5a of the drive element 5 and the front face of the wobble plate 9, and therefore, when the drive shaft 4 is rotated, the rotation of the drive shaft 4 and the drive element 5 is converted into the wobbling motion of the wobble plate 9 about the center of the bearing ball 8 via the thrust bearing assembly 10, whereby the pistons 11 are urged to reciprocate in the cylinder bores 1b by the wobble plate 9 via the piston rods 11a. When the pistons 11 reciprocate in the cylinder bores 1b, the refrigerant gas is pumped into the cylinder bores 1b from the suction chamber 3a via the valve plate unit 3c, and compressed by the pistons 11. The compressed refrigerant gas is then discharged from the cylinder bores 1b into the discharge chamber 3b via the valve plate unit 3c.

Figure 4:
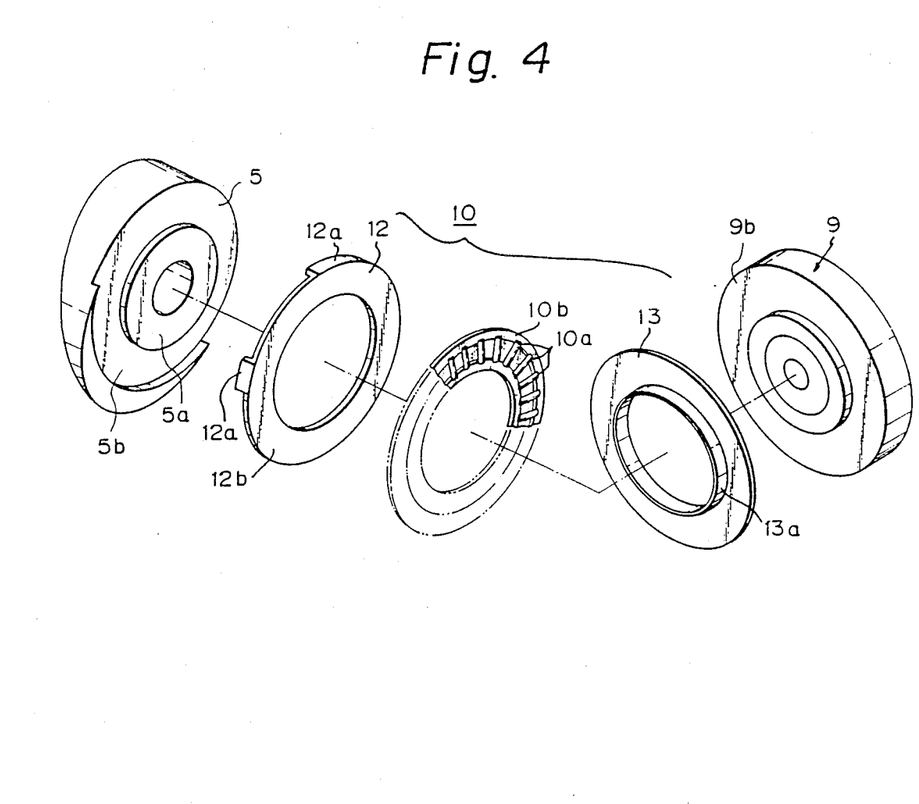
FIG. 4 is an exploded perspective view of the thrust bearing assembly arranged between the drive element and the wobble plate of the wobble plate type compressor of FIGS. 1 through 3.

The thrust bearing assembly 10 includes a plurality of roller elements 10a, an annular retainer element 10b for retaining the roller elements 10a, a first annular race element 12 secured to the rotatable drive element 5, and a second annular race element 13 secured to the wobble plate 9.

Figure 2:
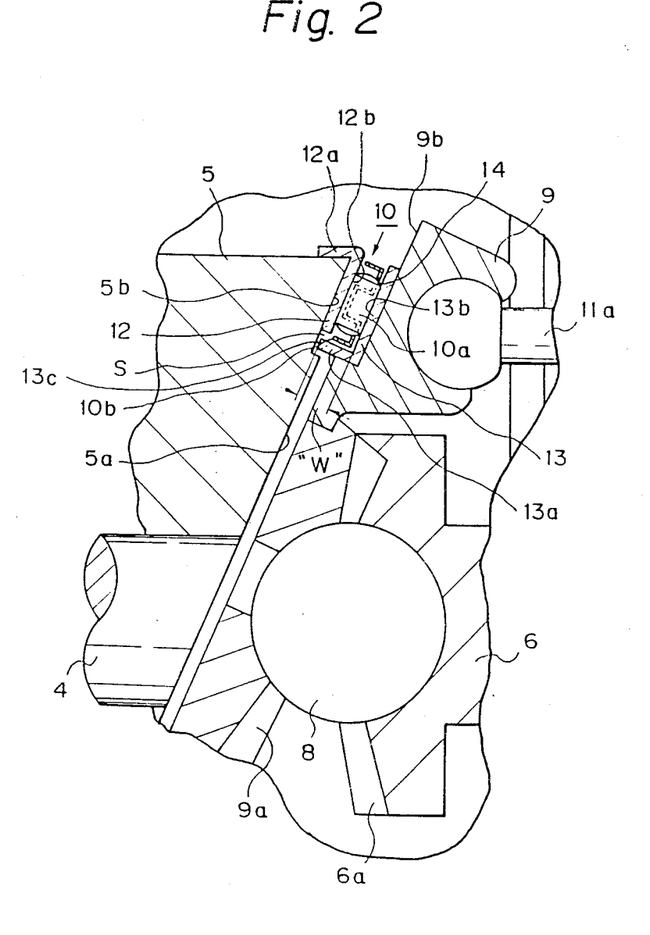
FIG. 2 is a partial enlarged view of mutually facing portions of a drive element and a wobble plate, illustrating a state where the roller elements of a thrust bearing assembly are adequately held between the mutually confronting raceways of race elements attached to the drive element and the wobble plate.

The first race element 12 has an appropriate number of claws 12a engaged with an outer periphery of the drive element 5, and an annular raceway 12b seated on an annular recess 5b formed in an outer circumference of the inclined drive face 5a of the drive element 5. The annular raceway 12b of the first race element 12 is provided to permit the roller elements 10a to roll thereon, and has an inner diameter larger than that of inner diameter of the annular recess 5b of the drive element 5, to provide an annular spacing S, as best illustrated in FIG. 2, between the innermost ends of the first race element 12 and the annular recess 5b of the drive element 5. The front face of the wobble plate 9 facing the inclined drive face 5a of the drive element 5 is provided, at an outer circumference of the wobble plate 9, with an annular recess 9b confronting the annular recess 5b of the drive element 5. The second annular race element 13 is seated on and fixedly secured to the annular recess 9b of the wobble plate 9. The second annular race element 13 has an annular raceway portion 13b and a circumferentially extended guide portion 13a at an innermost end of the annular raceway portion 13b of the element 13. The guide portion 13a of the second annular race element 13 is snugly fitted on the cylindrical wall portion of the wobble plate 9 raised from an innermost end of the annular recess 9b.

As best illustrated in FIG. 2, respective roller elements 10a of the thrust bearing assembly 10 are held in chambers 14 of the annular retainer element 10b in such a manner that each roller element 10a is able to roll about an axis thereof while the radial movement thereof is limited. The roller elements 10a held by the retainer element 10b can roll on the raceway portions 12b and 13b of the first and second annular race elements 12 and 13 in response to the rotation of the drive element 5, and the rolling of these roller elements 10a on the raceway portions 12b and 13b permits the retainer element 10b to rotate between the race elements 12 and 13 without coming into contact with these elements 12 and 13. Namely, the rotating motion of the retainer element 10b of the thrust bearing assembly 10 is guided by and slid on the circumferentially extended guide portion 13a of the race element 13. It should be noted that the guide portion 13a of the race element 13 has a width "W" wider than the thickness of the assembly of the retainer element 10b and the roller elements 10a. Namely, an outer free end 13c of the guide portion 13a of the race element 13 is provided to extend into the spacing S of the drive element 5 and is adjacent to the innermost end of the raceway portion 12b of the race element 12, when the roller elements 10a of the thrust bearing assembly 10 are in constant contact with both of the raceway portions 12b and 13b of the race elements 12 and 13 and as illustrated in FIG. 2. In this state, the guide portion 13a of the race element 13 can provide the annular retainer element 10b with a sufficient guiding while allowing the element 10b to carry out a stable sliding motion on the guide portion 13a. The guide portion 13a of the race element 13 does not come into contact with the first race element 12 and the drive element 5, and functions to prevent any radial play of the annular retainer element 10b.

Figure 3:
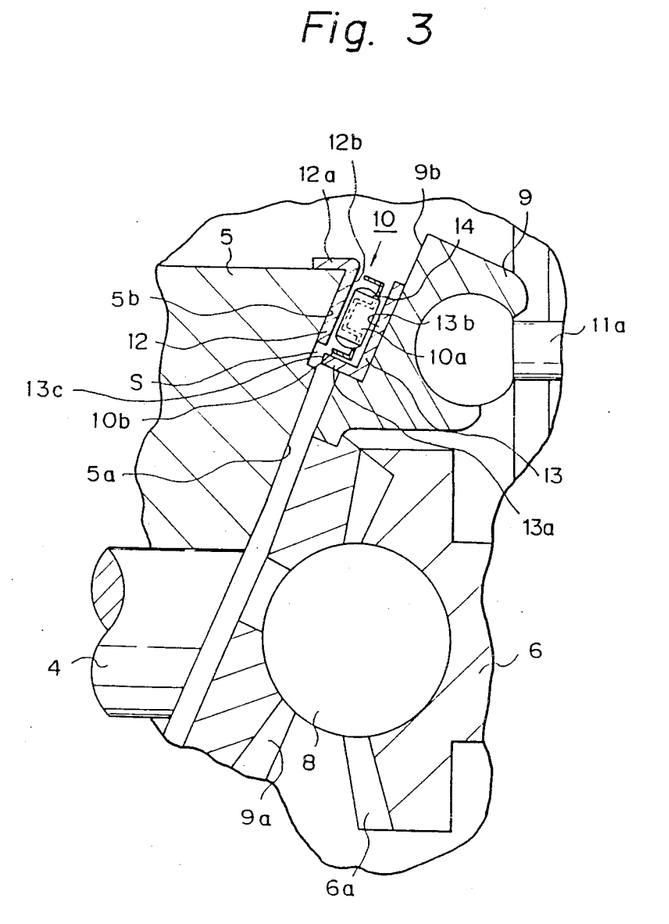
FIG. 3 is a similar partial enlarged view of mutually facing portions of the drive element and the wobble plate, illustrating another state where the roller elements of the thrust bearing assembly are not held between the mutually confronting raceways of the race elements attached to the drive element and the wobble plate.

On the other hand, as illustrated in FIG. 3, when the wobble plate 9 is inertially displaced to a state in which the front face 9b of the wobble plate 9 is separated from the face of the annular recess 5b of the drive element 5, a space between the raceway portion 12b of the first race element 12 and the raceway portion 13b of the second race element 13 is increased and becomes larger than the thickness of the assembly of the roller elements 10a and the retainer element 10b. Accordingly, uncontrolled play of the assembly of the roller elements 10a and the retainer element 10b occurs in the space between the confronting raceway portions 12b and 13b, in a direction vertical to the faces of both raceway portions 12b and 13b. Namely, the constant contact condition of the roller elements 10a with the raceway portions 12b and 13b of the first and second race elements 12 and 13 is lost, and as a result, when the annular retainer element 10b moves in the above-mentioned space, the innermost end of the annular retainer element 10b molves freely and irregularly on the circumferentially extended guide portion 13a of the race element 13. Nevertheless, since the width "W" of the circumferentially extended guide portion 13a of the race element 13 is intended to increase to an extent such that the free end 13c of the guide portion 13c is not spaced from a plane on which the raceway portion 12b of the race element 12 lies during operation of the compressor, the annular retainer element 10b can be constantly guided by the guide portion 13a of the race element 13. Namely, if the free end 13c of the guide portion 13c were spaced from a plane on which the raceway portion 12b of the race element 12 lies, in response to the displacement of the wobble plate 9 in a direction away from the drive element 5, the innermost end of the annular retainer element 10b might slip into a gap between the free end 13c of the guide portion 13c and the raceway portion 12b of the first race element 12, and as a result, the retainer element 10b might be damaged and eventually broken due to an abutting of the element 10b against the free end 13c of the guide portion 13c. Nevertheless, the increased width "W" of the circumferentially extended guide portion 13a of the race element 13 still can prevent the occurrence of damage to or breakage of the retainer element 10b, without the need for additional mechanical parts or elements, even if the separation of the front face 9b of the wobble plate 9 from the outer circumference of the drive element 5 occurs during a high speed running of the compressor, i.e., a high speed wobbling motion of the wobble plate 9. It should be particularly appreciated that an increase in the width "W" of the circumferentially extended guide portion 13a of the race element 13 requires no additional accuracy in the manufacturing of the first and second race elements 12 and 13, converse to the prior art, and thus there is no increase in the manufacturing cost of the thrust bearing assembly including the first and second race elements 12 and 13, and the assembly of the roller elements 10a and the annular retainer element 10b but the reliability of the operation of the wobble plate type refrigerant compressor is enhanced.

Figure 5:
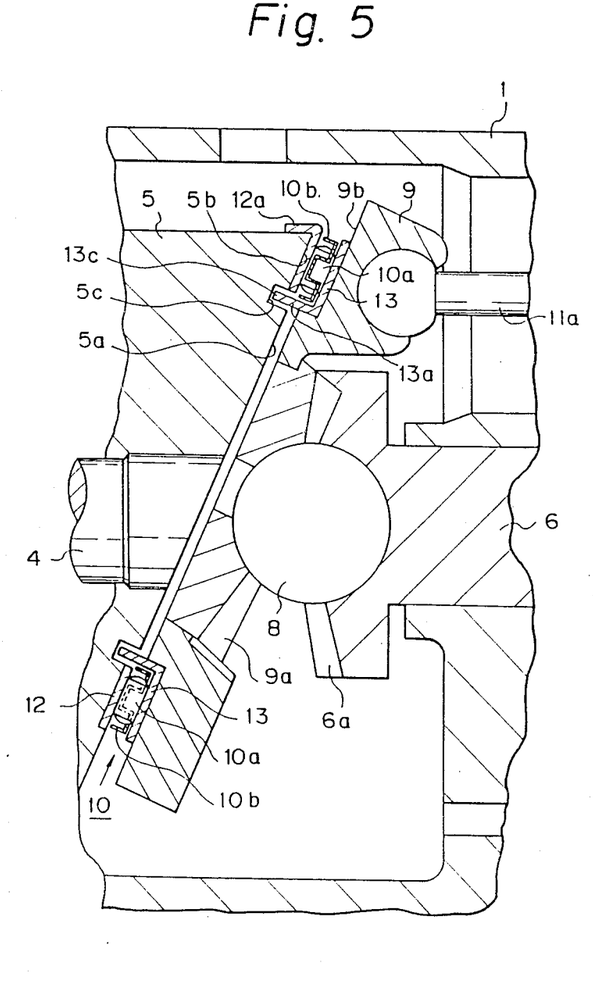
FIG. 5 is a partial enlarged view of a portion of a wobble plate type compressor having a wobble plate support according to another embodiment of the present invention.

FIG. 5 illustrates another embodiment of the present invention, in which the inclined drive face 5a of the rotatable drive element 5 mounted on the drive shaft 4 is provided with an annular groove 5c in addition to the annular recess 5b at a position adjacent to an innermost portion of the annular recess 5b, and the free end 13c of the circumferentially extended guide 13a of the second race element 13 is further extended until the free end 13c enters into the groove 5c without coming into contact with the drive element 5. This construction of FIG. 5 will further ensure a constant guide of the annular retainer element 10b of the thrust bearing assembly 10 by the circumferentially extended guide portion 13a of the race element 13 over the entire running speed range of the compressor. Therefore, a prevention of damage to or breakage of the retainer element 10b can be additionally guaranteed.

Figure 6:
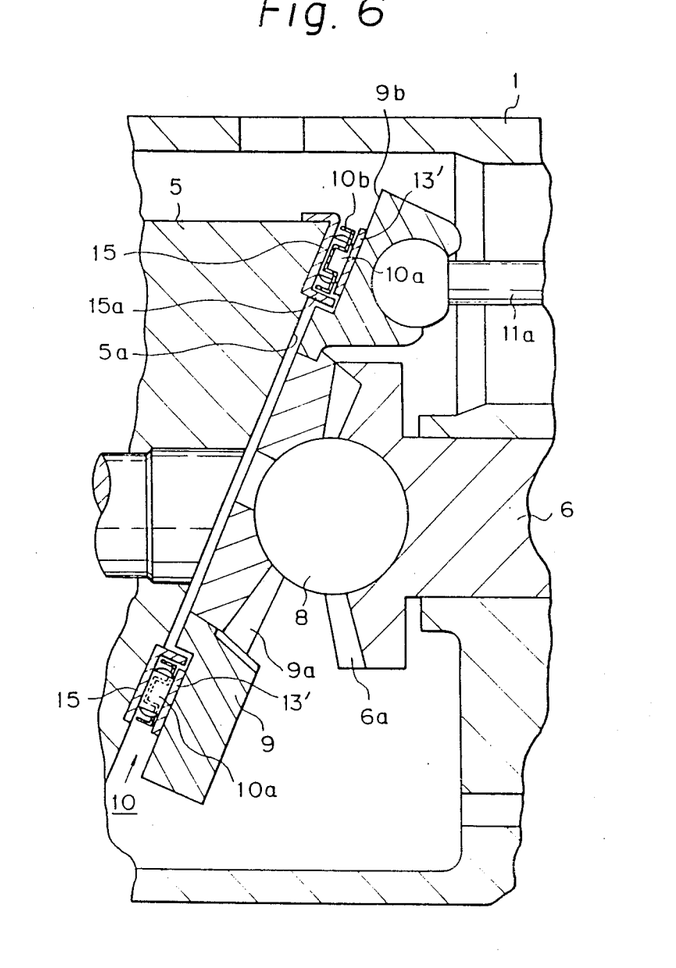
FIG. 6 is a partial enlarged view of a portion of a wobble plate type compressor having a wobble plate support according to a further embodiment of the present invention.

FIG. 6 illustrates a further embodiment of the present invention. In the embodiment of FIG. 6, a first race element 15 of the thrust bearing assembly having a circumferentially extended guide 15a, is employed to provide a constant guide to an innermost end of a rotatable annular retainer element 10b holding roller elements 10a, even if a separation of the wobble plate 9 from the drive element 5 occurs during a high running speed range of the compressor. As the drive element 5 rotates twice as fast as the annular retainer element 10b of the thrust bearing assembly 10, the latter element 10b must slide on the surface of the guide 15a of the first race element 15. Nevertheless, the sliding motion of the element 10b can be constantly guided by the circumferentially extended guide 15a, and thus damage to or breakage of the annular retainer element 10b can be avoided. Therefore, the annular retainer element 10b is able to reliably hold the roller elements 10a of the thrust bearing assembly 10, and accordingly, a reliable operation of the compressor can be ensured. A second race element 13' is appropriately secured to the front face 9b of the wobble plate 9.

From the foregoing description of the preferred embodiments of the present invention it will be understood that, according to the present invention, the performance of the wobble plate type refrigerant compressor can be effectively enhanced without an increase in the cost and accuracy when manufacturing the compressor per se.

It should be understood that the present invention may be similarly applied to other types of variable displacement wobble plate type compressor, such as a compressor in which a rotatable drive element having a variable angle of inclination causes a wobbling motion of a wobble plate to thereby reciprocate compressor pistons.

We claim:

1. A wobble plate type refrigerant compressor including an open ended cylinder block defining a plurality of axial cylinder bores and a crank chamber therein, a first housing attached to one of the open ends of the cylinder block to close the open end of the cylinder block and rotatably support an axial drive shaft, a second housing attached to the other open end of the cylinder block to close the other open end of the cylinder block and define suction and discharge chambers for receiving a refrigerant gas before and after compression, a drive element fixedly mounted on the drive shaft to be rotatable therewith, and having a drive face inclined with respect to a plant vertical to an axis of the drive shaft, the drive face being provided with an annular recess at an outer periphery thereof, a plurality of pistons received in the plurality of cylinder bores to be reciprocated in the cylinder bores to thereby compress the refrigerant gas, and non-rotatable wobble plate supported on the drive element via a thrust bearing assembly, the wobble plate having a first face facing the drive face of the drive element and an opposite second face operatively connected to the plurality of pistons via piston rods to thereby cause a reciprocation of plurality of pistons in response to a rotation of the drive element, and an improvement thereof wherein said thrust bearing assembly comprises:

a plurality of roller elements arranged between said drive face of said drive element and said first face of said non-rotatable wobble plate to allow said drive element to be freely rotated against said non-rotatable wobble plate;

a retainer element arranged to extend circumferentially in a space between said drive face of said drive element and said first face of said wobble plate for retaining said plurality of roller elements in position;

a first annular race element arranged between said drive face of said drive element and said thrust bearing assembly and having a first annular raceway, said first annular race element being fixedly seated on said annular recess of said drive face of said drive element;

a second annular race element arranged between said thrust bearing assembly and said first face of said wobble plate to have a second annular raceway capable of cooperating with said first annular raceway of said first annular race element to permit said roller elements of said thrust bearing assembly to roll between said first and second raceways; and a circumferentially extended guide element provided with a circumferential guideway to guide a radially innermost end of said retainer element, said circumferential guideway extending substantially perpendicularly to both said drive face and said retainer element, said circumferential guideway extending substantially perpendicularly to both said drive face and said first face of said drive element and said wobble plate to provide a guiding width able to supply said radially innermost end of said retainer element with a constant sliding guide under all conditions of operation of said compressor.

2. A wobble plate type refrigerant compressor according to claim 1, wherein said circumferentially extended guide element is formed integrally with said second annular race element.

3. A wobble plate type refrigerant compressor including an open ended cylinder block defining a plurality of axial cylinder bores and a crank chamber therein, a first housing attached to one of the open ends of the cylinder block to close the open end of the cylinder block and rotatably support an axial drive shaft, a second housing attached to the other open end of the cylinder block to close the other open end of the cylinder block and define suction and discharge chambers for receiving a refrigerant gas before and after compression, a drive element fixedly mounted on the drive shaft to be rotatable therewith, and having a drive face inclined with respect to a plane vertical to an axis of the drive shaft, the drive face being provided with an annular recess at an outer periphery thereof and an annular groove formed at an innermost portion of the annular recess, a plurality of pistons received in the plurality if cylinder bores to be reciprocated in the cylinder bores to thereby compress the refrigerant gas, and a non-rotatable wobble plate supported on the drive element via a thrust bearing assembly, the wobble plate having a first face facing the drive face of the drive element and an opposite second face operatively connected to the plurality of pistons via piston rods to thereby cause a reciprocation of the plurality of pistons in response to a rotation of the drive element; and an improvement thereof wherein said thrust bearing assembly comprises:

a plurality of roller elements arranged between said drive face of said drive element and said first face of said non-rotatable wobble plate to allow said drive element to be freely rotated against said non-rotatable wobble plate;

a retainer element arranged to extend circumferentially in a space between said drive face of said drive element and said first face of said wobble plate for retaining said plurality of roller elements in position;

a first annular race element arranged between said drive face of said drive element and said thrust bearing assembly and having a first annular raceway, said first annular race element being fixedly seated on said annular recess of said drive face of said drive element;

a second annular race element arranged between said thrust bearing assembly and said first face of said wobble plate to have a second annular raceway capable of cooperating with said first annular raceway of said first annular race element to permit said roller elements of said thrust bearing assembly to roll between said first and second raceways; and, a circumferentially extended guide element provided with a circumferential guideway to guide a radially innermost end of said retainer element, said circumferential guideway extending sbustantially perpendicularly to both said drive face and said first face of said drive element and said wobble plate to provide a guiding width able to supply said radially innermost end of said retainer element with a constant sliding guide under all conditions of operation of said compressor, a free end of said circumferential guideway of said circumferentially extended guide element being positioned so as to enter said annular groove.

4. A wobble plate type refrigerant compressor according to claim 3, wherein said circumferentially extended guide element is formed integrally with said first annular race element.

5. A wobble plate type refrigerant compressor according to claim 3, wherein said guiding width of said circumferentially extended guide element is larger than a width of an assembly of said plurality of roller elements and said retainer element.

6. A wobble plate type refrigerant compressor according to claim 5, wherein said circumferentially extended guide element is formed integrally with said first annular race element.

* * * * *